United States Patent

Okada

(10) Patent No.: US 12,504,601 B2
(45) Date of Patent: Dec. 23, 2025

(54) LENS BARREL, LENS APPARATUS AND IMAGE PICKUP APPARATUS

(71) Applicant: CANON KABUSHIKI KAISHA, Tokyo (JP)

(72) Inventor: Tadanori Okada, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 421 days.

(21) Appl. No.: 18/167,167

(22) Filed: Feb. 10, 2023

(65) Prior Publication Data

US 2023/0266562 A1 Aug. 24, 2023

(30) Foreign Application Priority Data

Feb. 18, 2022 (JP) ................. 2022-023372

(51) Int. Cl.
*G02B 7/09* (2021.01)
*G02B 7/14* (2021.01)
*G02B 7/28* (2021.01)
*G03B 17/14* (2021.01)

(52) U.S. Cl.
CPC ................. *G02B 7/09* (2013.01); *G02B 7/14* (2013.01); *G02B 7/282* (2013.01); *G03B 17/14* (2013.01)

(58) Field of Classification Search
CPC . G02B 7/09; G02B 7/10; G02B 7/105; G02B 7/14; G02B 7/282; G02B 7/021; G02B 7/102; G03B 17/14; G03B 5/00; G03B 17/04

See application file for complete search history.

(56) References Cited

U.S. PATENT DOCUMENTS

| | | | |
|---|---|---|---|
| 8,508,857 B2 | 8/2013 | Kudoh | |
| 2009/0231709 A1* | 9/2009 | Nomura | G03B 17/04 359/557 |
| 2010/0002316 A1* | 1/2010 | Nomura | G02B 7/021 359/817 |
| 2016/0223779 A1* | 8/2016 | Terahara | G02B 7/10 |

FOREIGN PATENT DOCUMENTS

| | | |
|---|---|---|
| JP | 2002350954 A | 12/2002 |
| JP | 2009128472 A | 6/2009 |
| JP | 2011090257 A | 5/2011 |
| JP | 2011237471 A | 11/2011 |
| JP | 2015055799 A | 3/2015 |

* cited by examiner

*Primary Examiner* — Marin Pichler
(74) *Attorney, Agent, or Firm* — ROSSI, KIMMS & McDOWELL LLP

(57) ABSTRACT

A lens barrel including: a base lens barrel; and a lens holding frame configured to hold a lens and be movably held in an optical axis direction relative to the base lens barrel, in which the base lens barrel has a first contact surface, and the lens holding frame has a second contact surface, in which the first contact surface and the second contact surface abut on each other in an image pickup state and separate from each other in the optical axis direction in a retracted state, in which the lens barrel includes a biasing member configured to bias the base lens barrel and the lens holding frame in a different direction from the optical axis direction such that the first contact surface and the second contact surface abut on each other.

14 Claims, 16 Drawing Sheets

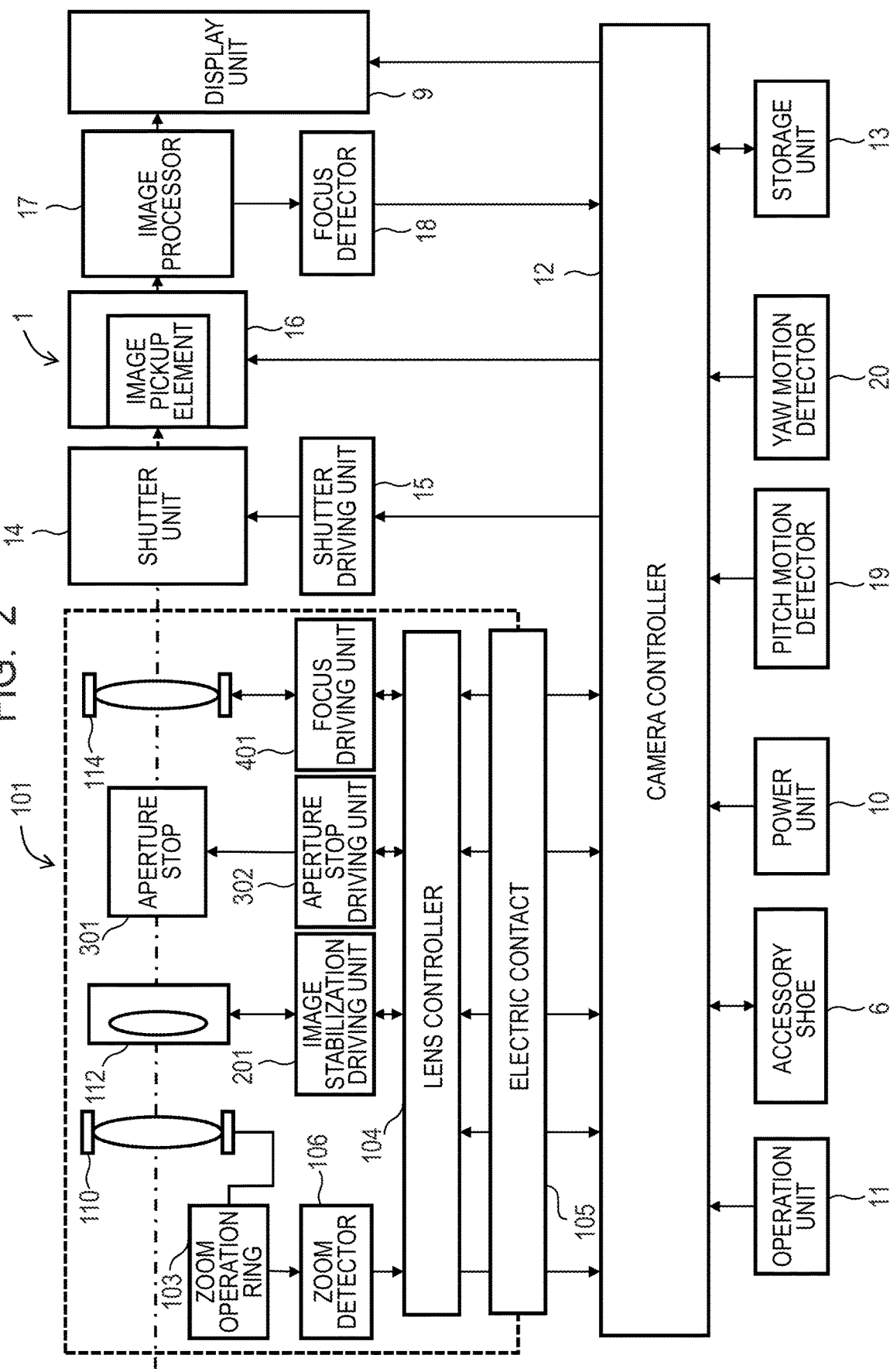

LENS BARREL, LENS APPARATUS AND IMAGE PICKUP APPARATUS

BACKGROUND OF THE INVENTION

Field of the Invention

The present invention relates to a lens barrel, a lens apparatus, and an image pickup apparatus.

Description of the Related Art

Some optical devices such as digital cameras, video cameras and interchangeable lenses are equipped with a lens barrel that is configured to move a zoom lens unit and a focus lens unit by zooming. Many optical devices have achieved a miniaturization of the lens barrel in a retracted state by making intervals between adjacent lens units smaller when changing a state from an image pickup condition to a state in which the image pickup is restricted, such as a retracted state. In order to achieve it, a biasing member such as a spring is used to hold a lens holding frame in the image pickup state, and in the retracted state, the lens holding frame is brought into contact with another movable member or a fixed member and is moved against a biasing force of a biasing member.

Japanese Patent Application Laid-Open No. 2011-090257 discloses a configuration in which a base movable barrel configured to move for zooming holds a lens holding frame movably in an optical axis direction, and in an image pickup state, the base movable barrel and the lens holding frame are integrally held by making the lens holding frame abut on an edge of the base movable barrel using a biasing member. Then, when changing to a retracted state, the lens holding frame is brought into contact with the fixed part, the lens holding frame is moved relative to the base movable barrel against to a spring force to shorten intervals between lens units of an image pickup lens, to thereby making the entire lens barrel compact.

In recent years, there has been a demand for a smaller lens barrel. Therefore, conventional compact digital cameras have a configuration in which, when changing from the image pickup state to the retracted state in which picking up an image is restricted, intervals between every adjacent lens units are narrowed in comparison to the image pickup state to achieve compactness in size. A growing number of lens barrels adopts such a structure in an interchangeable lens of single lens reflex cameras and mirrorless cameras.

However, to maintain optical performance, it is necessary to maintain positional accuracy of each lens unit with high precision.

Japanese Patent Application Laid-Open No. 2011-090257 discloses that a contact portion (protruding piece) of the lens holding frame is butted against an edge wall of the base movable barrel by the biasing member in the image pickup state, but does not disclose details of the contact portion so that there may cause the lens holding frame to tilt and wobble against the base movable barrel.

In addition, no detail is disclosed about a moving guide structure of the lens holding frame with respect to the base movable barrel, and even if an outer diameter portion of the lens holding frame and an inner diameter portion of the base movable barrel are fitted to each other, a gap must be provided in order to move them, and there is a risk that an eccentricity as much as fitting backlash may occur to cause a deterioration in optical performance.

SUMMARY OF THE INVENTION

The present invention provides a lens barrel having a compact retractable structure with a good optical performance.

A lens barrel includes: a base lens barrel; and a lens holding frame configured to hold a lens and be movably held in an optical axis direction relative to the base lens barrel, in which the base lens barrel has a first contact surface, and the lens holding frame has a second contact surface, in which the first contact surface and the second contact surface abut on each other in an image pickup state and separate from each other in the optical axis direction in a retracted state, in which the lens barrel includes a biasing member configured to bias the base lens barrel and the lens holding frame in a different direction from the optical axis direction such that the first contact surface and the second contact surface abut on each other.

According to the present invention, a lens barrel having a compact retractable structure with a good optical performance can be provided.

Further features of the present invention will become apparent from the following description of exemplary embodiments with reference to the attached drawings.

BRIEF DESCRIPTION OF THE DRAWINGS

FIG. 2 is a block diagram showing the configuration of the interchangeable lens and the digital camera according to Embodiment 1.

DESCRIPTION OF THE EMBODIMENTS

Embodiment 1

Embodiment 1 of the present invention will be described below with reference to the drawings. The same sign throughout each drawing indicates the same or corresponding part. While Embodiment 1 describes an interchangeable lens as an embodiment of an optical device, the present invention can be modified and modified in various ways within the scope of its gist, such as a camera with an integrated lens.

Figure 1A:
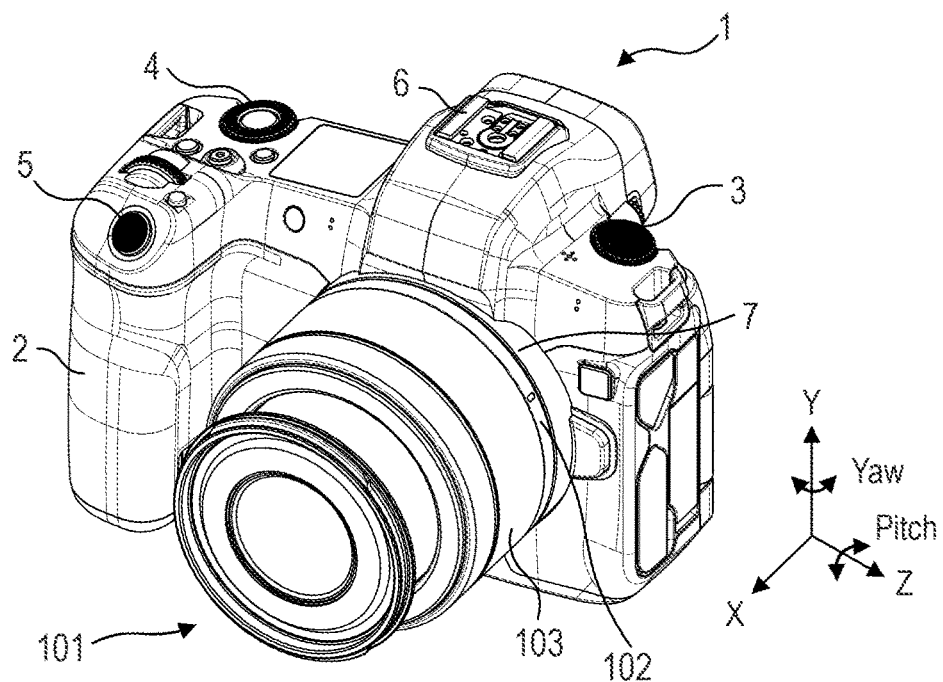
FIG. 1A is a front perspective view of an interchangeable lens and a digital camera according to Embodiment 1 of the present invention.
Figure 1B:
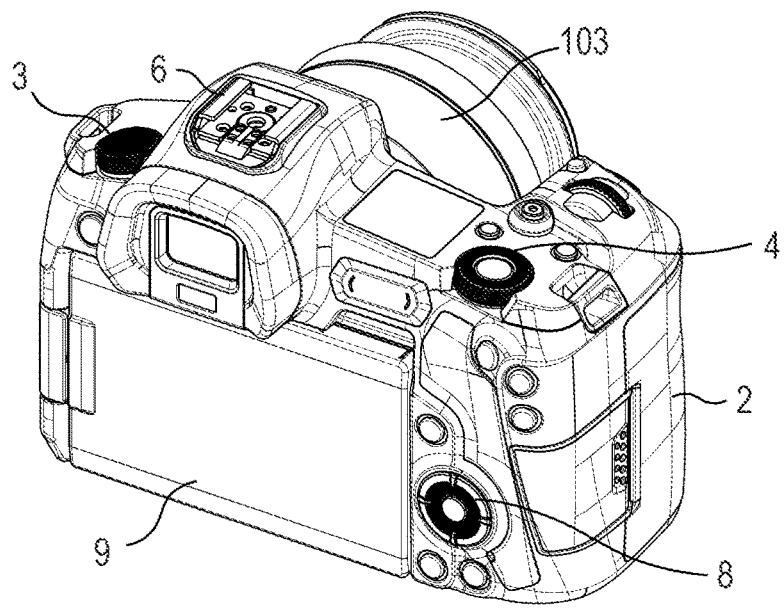
FIG. 1B is a back perspective view of the interchangeable lens and the digital camera according to Embodiment 1 of the present invention.

FIGS. 1A and 1B show external views of an interchangeable lens 101 according to Embodiment 1 of the present invention and a digital camera 1 (hereinafter referred to as a camera body) to which the interchangeable lens 101 is detachably mounted. FIGS. 1A and 1B are perspective views showing a front and rear sides, respectively. As shown in FIG. 1A, an optical axis direction in which an optical axis of an image pickup optical system accommodated by the interchangeable lens 101 extends is defined as an X-axis direction, and directions perpendicular to this direction are defined as a Z-axis direction (horizontal direction) and a Y-axis direction (vertical direction). Hereafter, Z-axis direction and Y-axis direction may be collectively referred to as the Z/Y-axis direction. The direction of rotation around the Z-axis is referred to as a Pitch direction, and the direction of rotation around the Y-axis is referred to as a Yaw direction. The pitch and yaw directions (Hereafter, it is also collectively referred to as the pitch/yaw direction.) are the directions of rotation about two axes, the Z and Y axes, which are perpendicular to each other.

On the left side (right side as seen from a rear side) of a camera body 1 when viewed from the front (an image pickup lens side), a grip member 2 is provided for a user to grip the camera body 1 by hand. On the upper surface of the camera body 1, a power operation unit 3 is arranged. When the user operates the power operation unit 3 while the camera body 1 is in a power-off state, the energization is started and the camera body 1 is turned on, and a computer program such as an origin detection process of a focus lens unit is executed to become a standby state for picking up an image. Conversely, if the user turns off the power operation unit 3 while camera body 1 is in a power-on state, the camera body 1 becomes the power-off state.

In addition, a mode dial 4, a release button 5 and an accessory shoe 6 are provided on the upper surface of the camera body 1. Users can rotate the mode dial 4 to switch between image pickup modes. The image pickup modes include a manual still image pickup mode in which the user can set image pickup conditions such as a shutter speed and an aperture stop value arbitrarily, an automatic still image pickup mode in which an appropriate exposure is automatically obtained, and a moving image pickup mode in which moving images are picked up. In addition, when the user half-presses the release button 5, the user can instruct a preparation for image pickup operations such as autofocus and automatic exposure control, and when the user full-presses the release button 5, the user can instruct picking up images. Accessories such as an external flash are detachably attached to the accessory shoe 6.

The interchangeable lens 101 is mechanically and electrically connected to a camera mount 7 provided in the camera body 1 via a lens mount 102 which is a mounting part to the camera body 1. An image pickup optical system that forms an object image by imaging light from an object is included in the interchangeable lens 101. A zoom operation ring 103 that is rotatable around the optical axis by user operation is provided on an outer circumference of the interchangeable lens 101. When the zoom operation ring 103 is rotated by the user, the zoom lens unit constituting the image pickup optical system is moved to a predetermined position of use corresponding to an angle of the zoom operation ring 103. In this way, the user can pickup images at desired angles of view.

As shown in FIG. 1B, A back operation unit 8 and a display unit 9 are provided on a rear surface of the camera body 1. The back operation unit 8 includes a plurality of buttons and dials to which various functions are assigned. When the camera body 1 is turned on the power and the still image pickup mode or the movie image pickup mode is set, a through image of the object image being picked up by an image pickup element described later is displayed on the display unit 9. In addition, image pickup parameters indicating image pickup conditions such as shutter speed and aperture stop value are displayed on the display unit 9, and the user can change the set values of the image pickup parameters by operating the back operation unit 8 while viewing the display. The back operation unit 8 includes a play button for instructing a playback of recorded picked up images, and when the play button is operated by the user, the picked up images are played back and displayed on the display unit 9.

FIG. 2 is a block diagram showing electrical and optical configurations of the interchangeable lens 101 and the camera body 1. The camera body 1 has a power unit 10 configured to provide electric power to the camera body 1 and the interchangeable lens 101, and an operation unit 11 that includes touch panel functions of the aforementioned power operation unit 3, the mode dial 4, the release button 5, the back operation unit 8 and the display unit 9. The control of the camera body 1 and the interchangeable lens 101 as a whole system is carried out by a camera controller 12 installed in the camera body 1 and a lens controller 104 installed in the interchangeable lens 101 working with each other. The camera controller 12 reads and executes a computer program stored in a storage unit 13. At that time, the camera controller 12 communicates various control signals, data, and the like with the lens controller 104 via a communication terminal of an electric contact 105 provided in the lens mount 102. The electric contact 105 includes a power terminal that supplies power from the aforementioned power unit 10 to the interchangeable lens 101.

The image pickup optical system of the interchangeable lens 101 have a zoom lens group 110 coupled to the zoom operation ring 103 and moving in an optical axis direction to change an angle of view, and an image stabilization lens unit 112 including a shift lens as a vibration isolator. The image stabilization lens unit 112 reduces image blur by moving (shifting) in a Z/Y axis direction perpendicular to the optical axis. The image pickup optical system also has an aperture stop 301 for performing light quantity adjustment operations and a focus lens unit 114 including a focus lens that moves in the optical axis direction for focus adjustment. In addition, the interchangeable lens 101 has an image stabilization driving unit 201 configured to move the image stabilization lens unit 112, an aperture stop driving unit 302 configured to drive the aperture stop 301, and a focus driving unit 401 configured to move the focus lens unit 114.

The camera body 1 has a shutter unit 14, a shutter driving unit 15, an image pickup element 16, an image processor 17, a focus detector 18 and the aforementioned camera controller 12. The shutter unit 14 controls an amount of light picked up by the image pickup optical system inside the interchangeable lens 101 and exposing the image pickup element 16. The image pickup element 16 photoelectrically converts the object image formed by the image pickup optical system and outputs an image pickup signal. The image processor 17 generates an image signal after performing various image processings on the picked up image signal. The display unit 9 displays the image signal (through image) output from the image processor 17, displays the shooting parameters as described above, and reproduces and displays the picked up image recorded on the storage unit 13 or a recording medium (not shown).

The camera controller 12 controls the focus driving unit 401 in response to a preparation operation for picking up image in the operation unit 11 (such as the half-press operation of the release button 5). For example, when an autofocus operation is instructed, the focus detector 18 determines a focus state of an object image to be picked up by the image pickup element 16 based on the image signal generated by the image processor 17, generates a focus signal and transmits it to the camera controller 12. Along with it, the focus driving unit 401 will transmit information about a current location of the focus lens unit 114 to the camera controller 12. The camera controller 12 compares the focus state of the object image with the current position of the focus lens unit 114, calculates a focus driving amount from a deviation, and transmits it to the lens controller 104. The lens controller 104 then moves the focus lens unit 114 to a target position in the optical axis direction via the focus driving unit 401 to correct a defocus of the object image.

More on this later, the focus driving unit 401 is equipped with a focus motor and a photo interrupter to detect an origin position of the focus lens unit 114. Generally, a stepping motor, which is a kind of actuator, is often adopted as a focus motor. However, since the stepping motor can control only a relative amount of driving, the current position of the focus lens unit 114 becomes indefinite in a power-off state of the camera body 1. If the electric power to the interchangeable lens 101 is interrupted, for example, in a case where the interchangeable lens 101 is mechanically detached from the camera mount 7 of the camera body 1 even if the camera body 1 remains in a power-on state, the focus lens unit 114 remains in its de-energized position and becomes undetectable. When the user turns the operation unit 3 on from such a state in which the current position of the focus lens unit 114 is indefinite, the focus lens unit 114 must first be moved to the origin position and an origin detection processing must be executed before the camera becomes the image pickup standby state. A DC motor or an ultrasonic motor equipped with an encoder may be used as the actuator. In addition, a photo interrupter directly receives light emitted from a light emitter at a light receiver, but a photo reflector that receives a reflected light from a reflecting surface or a brush that contacts a conductive pattern and electrically detects the signal may be used instead.

The camera controller 12 controls a driving of the aperture stop 301 and the shutter unit 14 via the aperture stop driving unit 302 and the shutter driving unit 15 according to the aperture stop value and the set value of the shutter speed received from the operation unit 11. For example, when the operation of the automatic exposure control is instructed, the camera controller 12 receives a brightness signal generated in the image processor 17 and performs photometric calculation. Based on a result of the photometric calculation, the camera controller 12 controls the aperture stop driving unit 302 in response to an image pickup instruction operation (such as a full-press operation of the release button 5) in the operation unit 11. Along with it, the camera controller 12 controls the driving of the shutter unit 14 via the shutter driving unit 15 and performs an exposure processing by the image pickup element 16.

The camera body 1 includes a pitch motion detector 19 and a yaw motion detector 20 as shake detection means capable of detecting the image blur caused by shaking of user or the like. The pitch motion detector 19 and the yaw motion detector 20 respectively use angular velocity sensors (vibration gyros) and angular acceleration sensors to detect image blur in a pitch direction (rotation around the z-axis) and a yaw direction (rotation around the y-axis) and output image blur signals. The camera controller 12 calculates a shift position of the image stabilization lens unit 112 in the y-axis direction using a deflection signal from the pitch motion detector 19. Similarly, the camera controller 12 calculates a shift position of the image stabilization lens unit 112 in the z-axis direction using a deflection signal from the yaw motion detector 20. According to the calculated shift positions in the pitch/yaw directions, the camera controller 12 moves the image stabilization lens unit 112 to the target position in the Z/Y axis directions via the image stabilization driving unit 201 to reduce the image blur during exposure or displaying the through image.

The interchangeable lens 101 has a zoom operation ring 103 for changing the angle of view of the image pickup optical system and a zoom detector 106 for detecting the angle of the zoom operation ring 103. The zoom detector 106 detects the angle of the zoom operation ring 103 operated by the user as an absolute value, and is constructed using, for example, a resistive linear potentiometer. Information about the angle of view detected by the zoom detector 106 is transmitted to the lens controller 104 and reflected in various controls performed by the camera controller 12 mentioned above. On the other hand, some of the variety of information is recorded with the picked up image on the storage unit 13 or a recording medium not shown.

Figure 3:
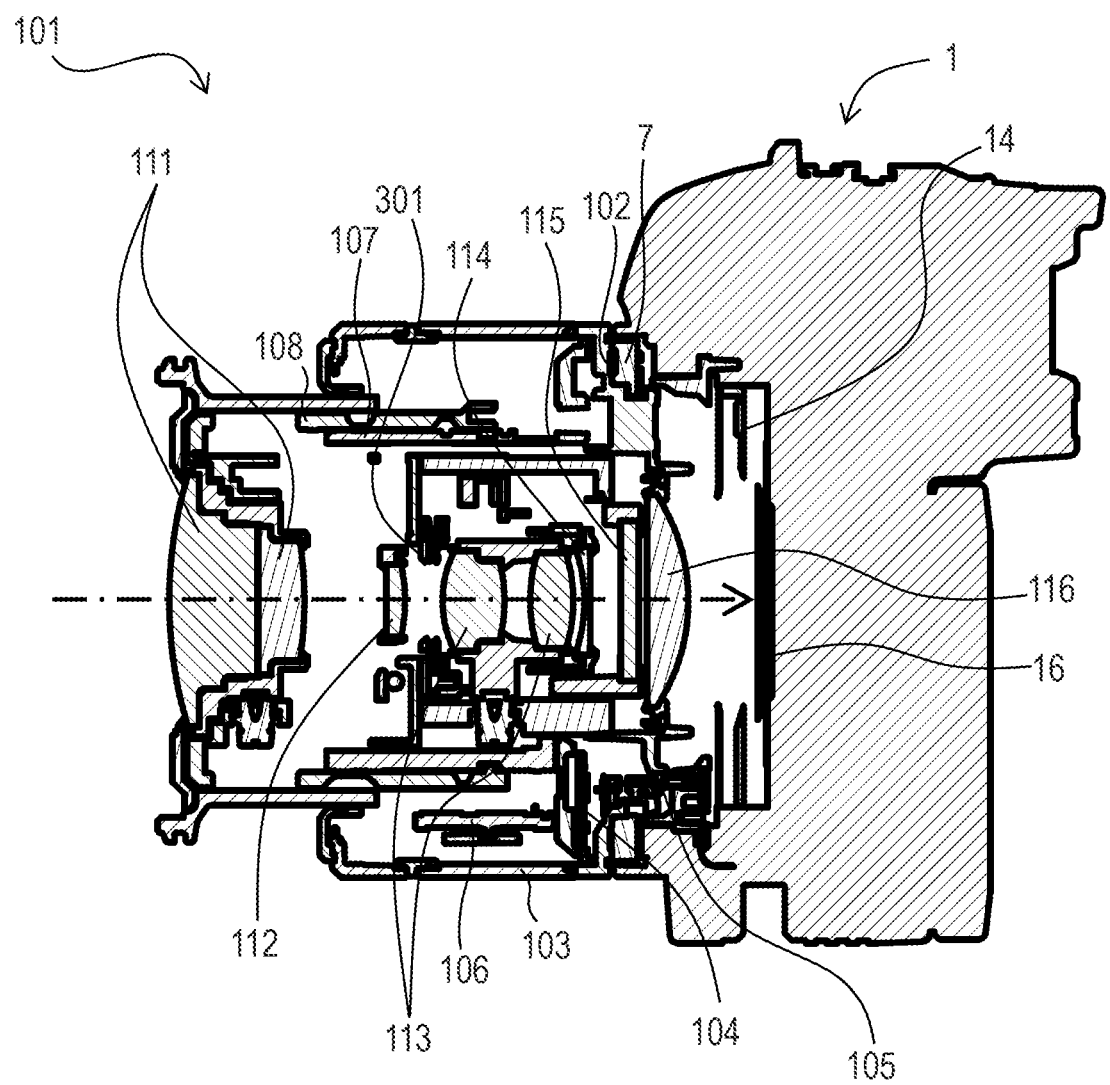
FIG. 3 is a sectional view of the interchangeable lens (wide angle end when picking up image) according to Embodiment 1.
Figure 4:
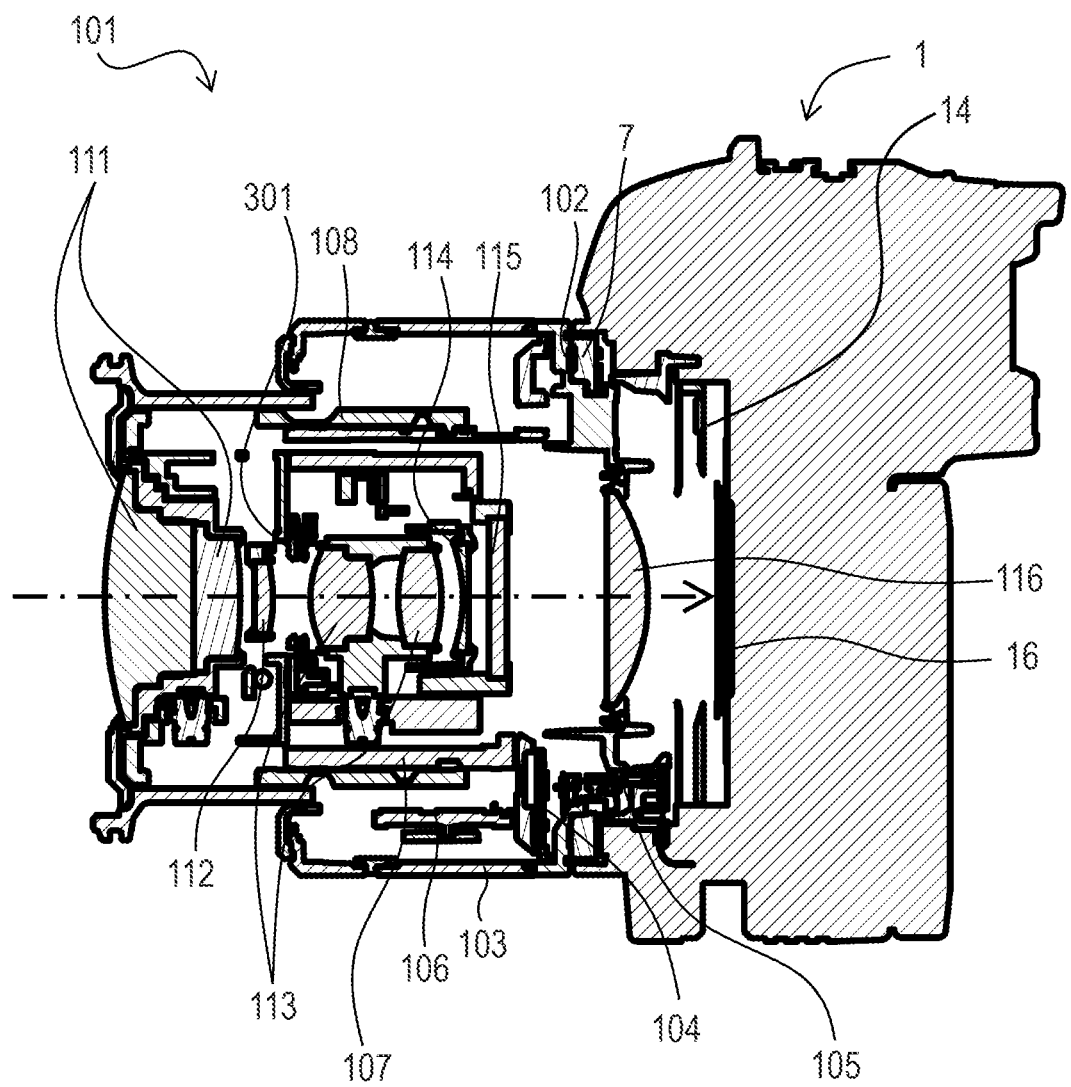
FIG. 4 is a sectional view of the interchangeable lens (telephoto end when picking up image) according to Embodiment 1.
Figure 5:
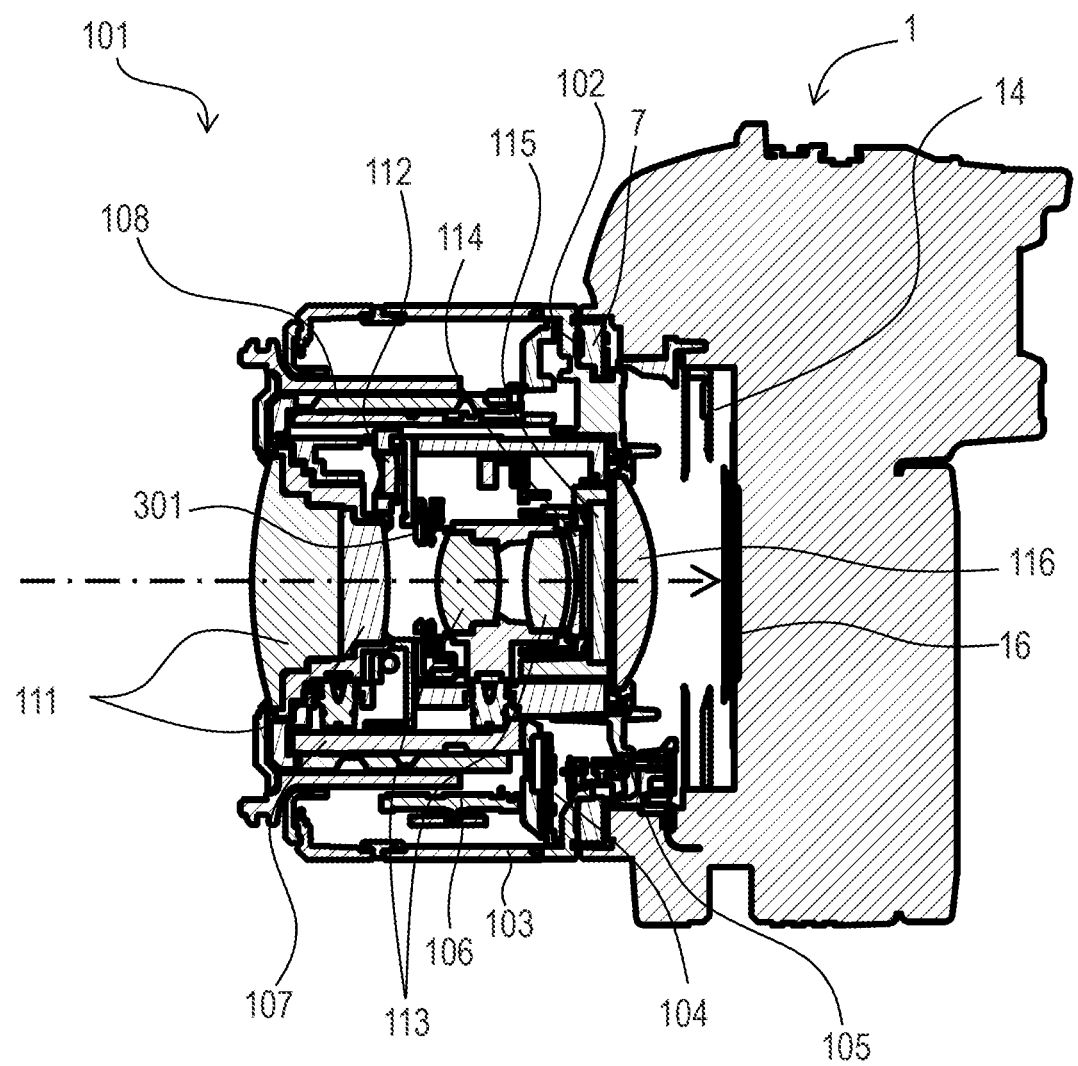
FIG. 5 is a sectional view of the interchangeable lens (retracted end when not picking up image) according to Embodiment 1.

Next, with reference to FIGS. 3, 4 and 5, positional relationships of main components in the interchangeable lens 101 are described. FIGS. 3, 4, and 5 are sectional views on the XY plane containing the optical axis, and a center line shown here roughly coincides with the optical axis defined by the image pickup optical system, so it will be synonymous with the optical axis below. FIGS. 3 and 4 show a wide-angle end on a short-focal length side and a telephoto end on a long-focal length side in zooming, respectively, both of which are ready for picking up image. On the other hand, FIG. 5 shows a retracted state (so-called a collapsed state) which is a state in which the picking up an image is disabled, showing that the total length is reduced most in the optical axis direction. As shown in FIG. 5, the lens apparatus (lens barrel) of the present invention has a collapsing mechanism and a configuration that enables the overall length in the optical axis direction to be shortened to be compact when not in use.

As shown in FIGS. 3 and 4, in this embodiment, a six lens units' configuration is adopted as an example of the image pickup optical system, in which the zoom lens group 110 is moved to a predetermined position of use different at the wide angle end and the telephoto end, respectively, so that the light from the object is to form an image on the image pickup element 16. The zoom lens group 110 includes a first zoom lens unit 111, an image stabilization lens unit 112 serving as a second zoom lens unit, an aperture stop 301, a third zoom lens unit 113 and a focus lens unit 114 serving as a fourth zoom lens unit, a fifth zoom lens unit 115 and a sixth zoom lens unit 116. The present invention does not limit the configuration of the image pickup optical system, for example, the image stabilization lens unit 112 or the focus lens unit 114 may function as another zoom lens unit. Also, some lens units may not be movable and may be fixed.

Figure 6:
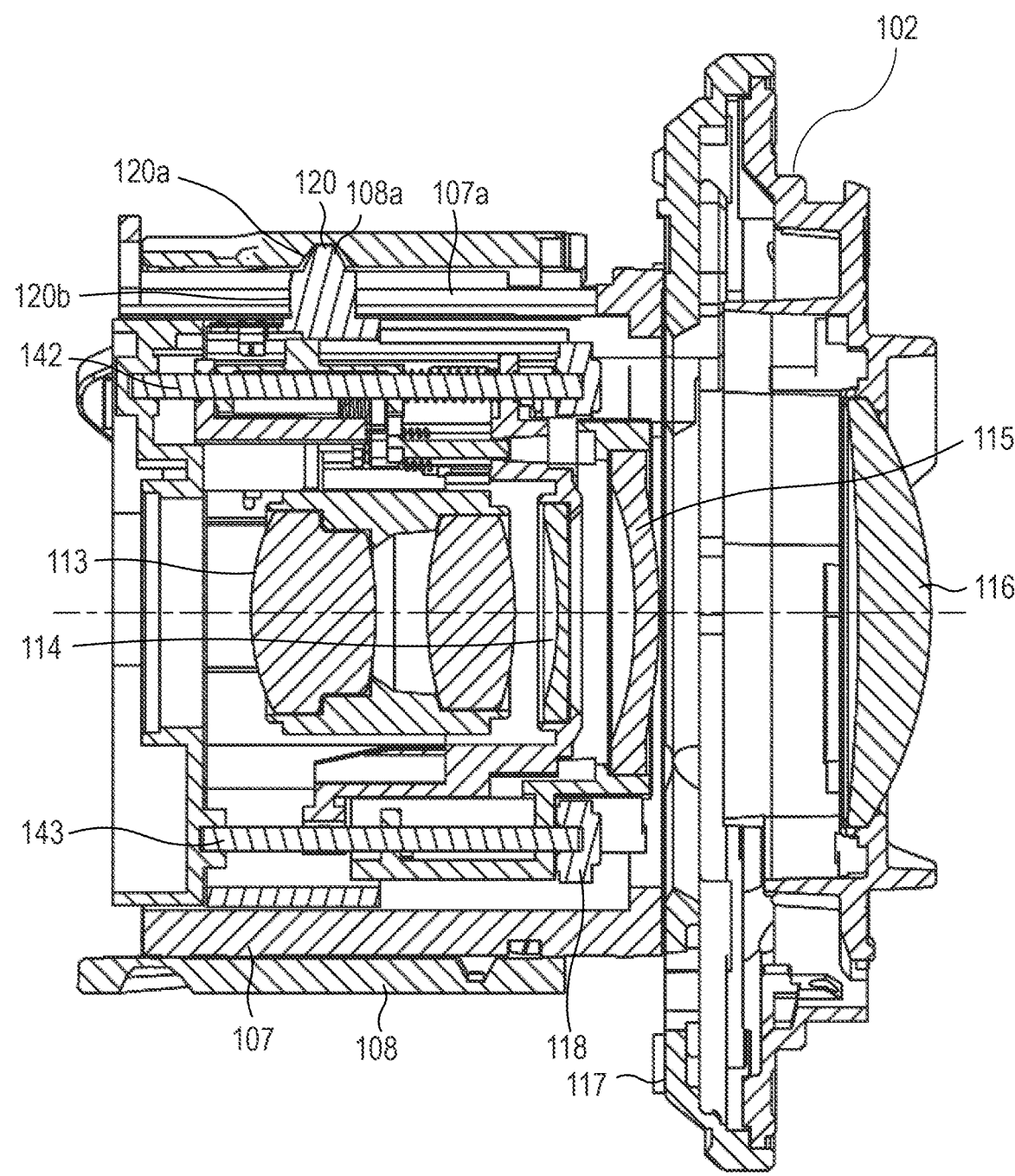
FIG. 6 is a sectional view of a main part showing a state of a wide angle end and closest distance focus of the interchangeable lens according to Embodiment 1.

A linear guide barrel 107 is a fixed member that is secured to the lens mount 102 via a fixed barrel 117 (see FIG. 6). Cam grooves (not shown) are formed in equal positions on an outer peripheral surface of the linear guide barrel 107. On the other hand, a cam follower (not shown) is provided on an inner peripheral side of a cam cylinder 108. In addition, a cam cylinder 108 is connected to the zoom operation ring 103 through a key not shown. When the zoom operation ring 103 is operated to rotate, the cam cylinder 108 moves forward and backward in the optical axis direction while rotating around the optical axis by the engagement of the cam groove with a cam follower.

Straight-ahead guide grooves are formed on the linear guide barrel 107 at an equal interval around the optical axis to regulate a movement of the zoom lens group 110 in a rotational direction and to guide a straight movement in the optical axis direction. Also, in the cam cylinder 108, cam grooves having loci of different angles in the rotational direction, corresponding to the zoom lens group 110, are also formed at equal interval around the optical axis. The zoom lens group 110, on the other hand, is provided with a plurality of cam followers, and each cam follower fits into the corresponding linear guide groove and cam groove. When the user rotates the zoom operation ring 103, the cam cylinder 108 rotates and the cam follower moves the zoom lens group 110 forward and backward in the optical axis direction while regulating the movement in the rotational direction by the engagement of the linear guide groove and the cam groove.

The interchangeable lens 101 in this embodiment has a retraction mechanism (not shown in detail) outside the optical axis of the image stabilization lens unit 112. This makes it possible to move the zoom lens group 110 further to the rear side (camera body 1 side) in the retracted state, reducing the overall length of the interchangeable lens 101 and thus making it more portable. At the wide angle end in FIG. 3, a distance between the first zoom lens unit 111 and the image stabilization lens unit 112 is wider whereas at the telephoto end in FIG. 4, a distance between the fifth zoom lens unit 115 and the sixth zoom lens unit 116 is wider. In the retracted position, the spaces between each of these lens units is narrowed to shorten the overall length in the optical axis direction in the retracted state.

As shown in FIG. 5, in the retracted state, the zoom lens group 110 is moved closer to each other. From this state, for example, when the user rotates the zoom operation ring 103 to the wide angle end, the zoom lens group 110 moves toward the object side, and when it moves to a predetermined position of use, the state shown in FIG. 3 ready for picking up image is realized. Such a mechanism is a well-known technology used in many optical instruments so far, so its explanation is omitted here.

In addition, while all zoom lens group 110 are arranged on the same optical axis at the time of picking up image shown in FIGS. 3 and 4, in the retracted state shown in FIG. 5, the image stabilization lens unit 112 retreats in a direction perpendicular to the optical axis (radial direction). When, for example, the user rotates the zoom operation ring 103 to the edge of retracted state from the state in which picking up image is possible as shown in FIG. 3, the zoom lens group 110 starts moving toward the camera body 1 side, but simultaneously, the image stabilization lens unit 112 is moved in the direction perpendicular to the optical axis to retreat from a position on the optical axis. In a space on an image pickup element side as a result of the retreatment, the first zoom lens unit 111 is further moved and housed so as not to interfere with each other, resulting in the shortest overall length shown in FIG. 5. A description of the retraction mechanism of the image stabilization lens unit 112 is omitted here because it is a well-known technology used in many optical devices.

Next, the detailed configuration of the rear lens unit according to the present invention will be described.

Figure 7:
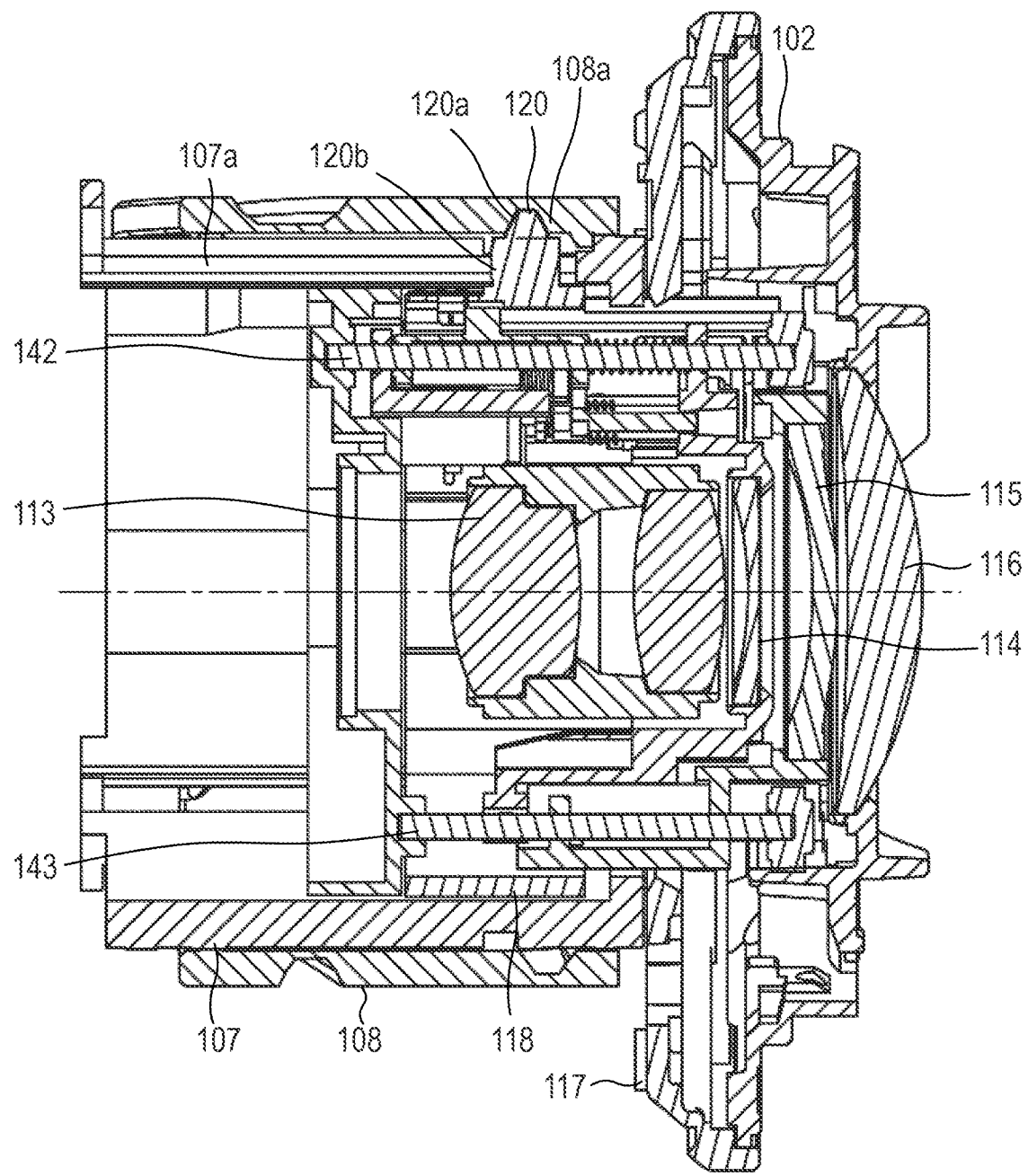
FIG. 7 is a sectional view of the main part showing the retracted state of the interchangeable lens of FIG. 6.

FIG. 6 shows the sectional view of a main part showing the state of the wide angle end and the closest focus of the interchangeable lens where the present invention is implemented, and FIG. 7 shows the sectional view of the main part in which the interchangeable lens shown in FIG. 6 is moved to the retracted state.

In FIGS. 6 and 7, the rear lens unit base barrel (base lens barrel) 118 holds the aperture stop 301 not shown, the third zoom lens unit 113, the focus lens unit 114, a focus driving unit 401 not shown and the fifth zoom lens unit 115, and moves with these members integrally during zooming. The rear lens unit base barrel 118 includes three cam followers 120 equally separated from each other on its outer circumference. The cam followers 120 engage tapered inner circumferential cam grooves 108a provided on the inner circumference of the cam cylinder 108, and an engaging member 120a of each cam follower 120 has a conical shape and is configured to make a line contact with a slope of the inner circumferential cam groove 108a. In addition, an inner periphery 120b of the cam follower 120 is engaged with a linear guide 107a provided in the linear guide barrel 107, and the rear lens unit base barrel 118 moves in the optical axis direction by rotating the cam cylinder 108.

Figure 8:
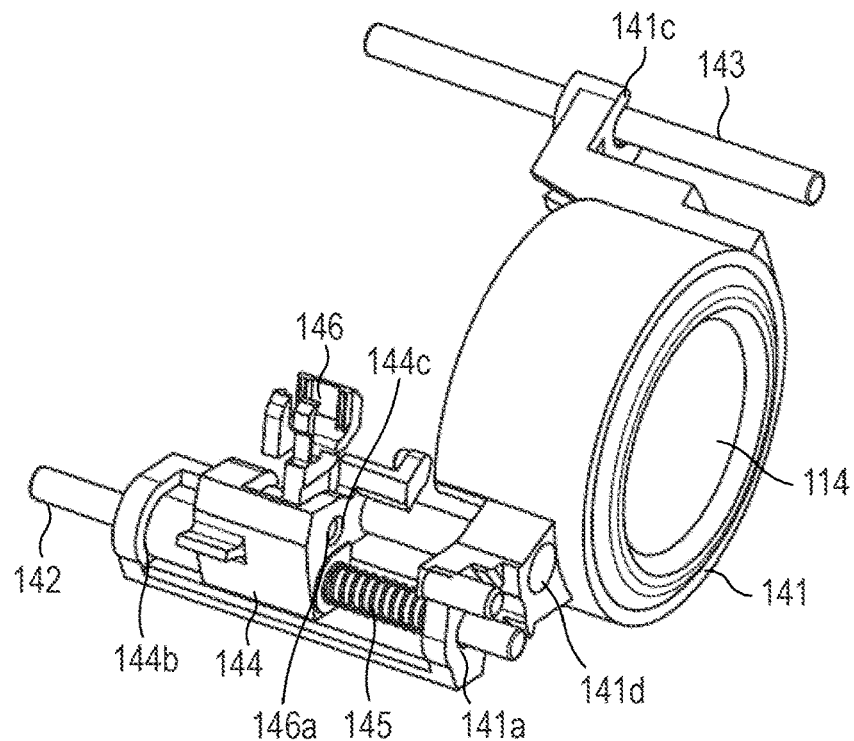
FIG. 8 is a perspective view showing a holding structure of a focus lens unit at the state of the wide angle end and the closest distance focus.
Figure 9:
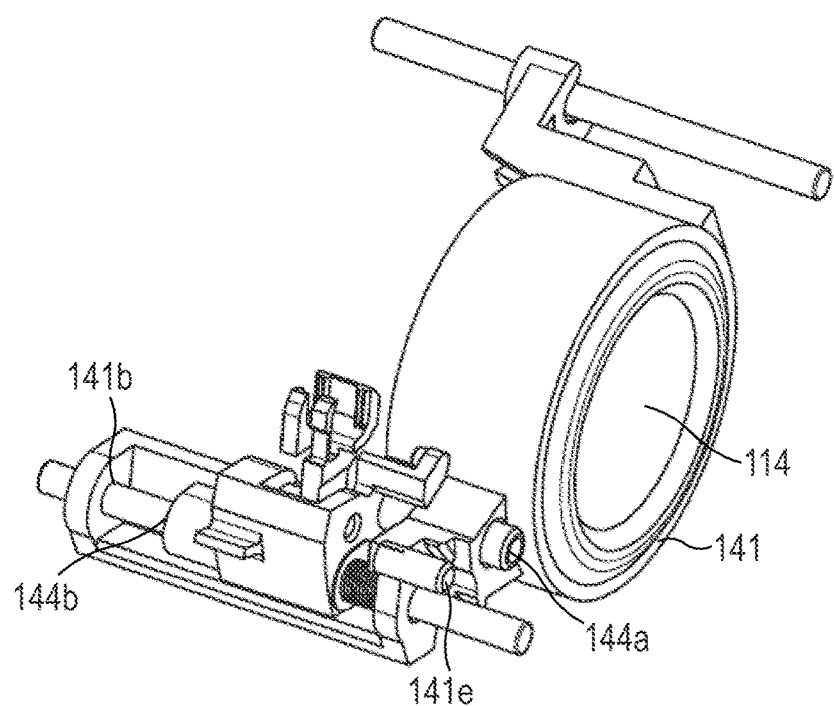
FIG. 9 is a perspective view of the holding structure of the focus lens unit at the retracted state.

FIGS. 8 and 9 are perspective views showing the holding structure of the focus lens unit (second lens) 114, FIG. 8 shows a state of the wide angle end and closest focus and FIG. 9 shows the retracted state.

In FIGS. 8 and 9, the fourth unit lens holding frame (second lens holding frame) 141 holds a lens that constitutes the focus lens unit 114. A guide bar 142 (second guide shaft member) is a metal member fixed to the rear lens unit base barrel 118 and is slidably (movably) engaged to a sliding hole 141a and a sliding hole 141b (two second fitting holes separated from each other in the optical axis direction) provided in the fourth unit lens holding frame 141. With the guide bar 142, the sliding hole 141a and the sliding hole 141b, the rear lens unit base barrel 118 and the fourth unit lens holding frame 141 constitute a second guide mechanism that allows relative movement in the optical axis direction. A guide bar 143 similarly fixed to the rear lens unit base barrel 118 engages a U-groove 141c provided in the fourth unit lens holding frame 141. With this, the guide bar 143 and the U-groove 141c constitute a second rotation stop mechanism, preventing a rotation of the fourth unit lens holding frame 141 around the guide bar 142, while the fourth unit lens holding frame 141 is held movably in the optical axis direction relative to the rear lens unit base barrel 118.

A rack holder 144 has a through hole into which the guide bar 142 is inserted. The rack holder 144 is held movable in an axial direction of the guide bar 142 and a boss 144a engages an elongated hole 141d provided in the fourth unit lens holding frame 141 to thereby preventing the rack holder 144 from rotating around the through hole. The rack holder 144 is biased by a coil spring 145 such that its edge portion 144b is pressed against a sliding hole 141b side of the fourth unit lens holding frame 141.

Figure 16:
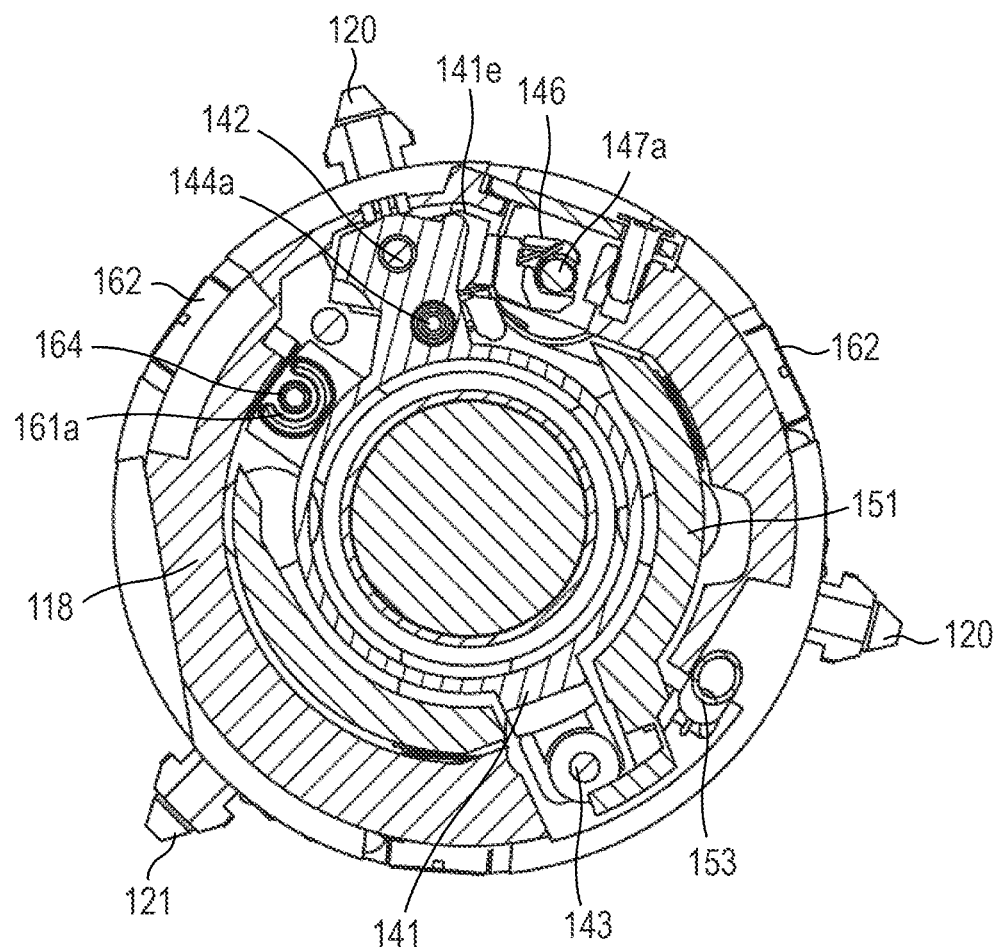
FIG. 16 is a sectional view of the rear lens unit base barrel as seen from A-A line in FIG. 15.

A rack 146 meshes with a feeding screw 147a of a stepping motor 147 that constitutes the focus driving unit 401 (see FIG. 16). The rack 146 is configured so that a rotation shaft 146a engages a shaft hole 144c of the rack holder 144 and allows only a rotation around the shaft hole 144c. With this configuration, the feeding screw 147a of the stepping motor 147 can engage stably even if it swings due to variations in component accuracy. With the above configuration, the fourth unit lens holding frame 141 can be moved in the optical axis direction driven by the stepping motor 147.

In the retracted state shown in FIG. 9, as the rear lens unit base barrel 118 moves, a contact portion 141e provided in the fourth unit lens holding frame 141 abuts on a fourth unit abutting portion 102a (see FIG. 10) provided in the lens mount 102, which is a fixed part. Then, since the rack 146 meshes with the feeding screw 147a and is not moved, allowing the fourth unit lens holding frame 141 to move against the rear lens unit base barrel 118 in a manner similar to compressing the coil spring 145.

Figure 10:
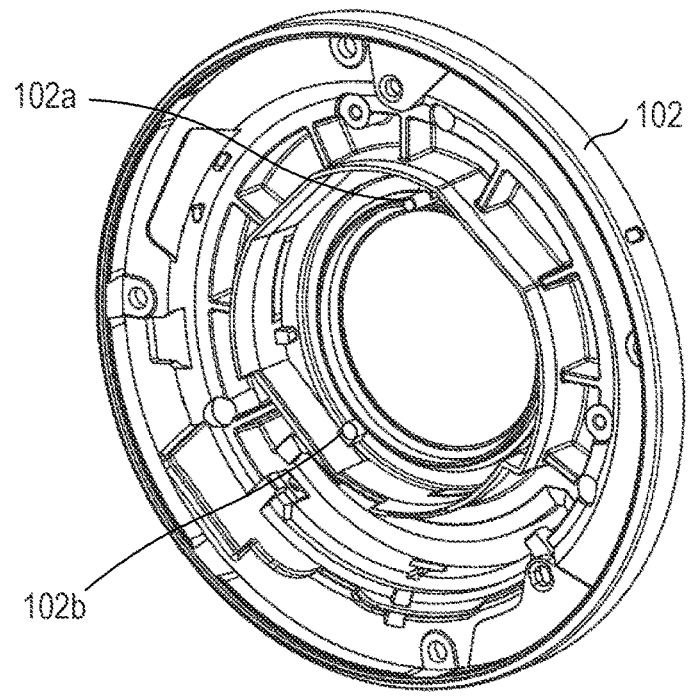
FIG. 10 is a perspective view of a lens mount 102 as seen from an object side.

FIG. 10 is a perspective view of the lens mount 102 as seen from the object side.

Figure 11:
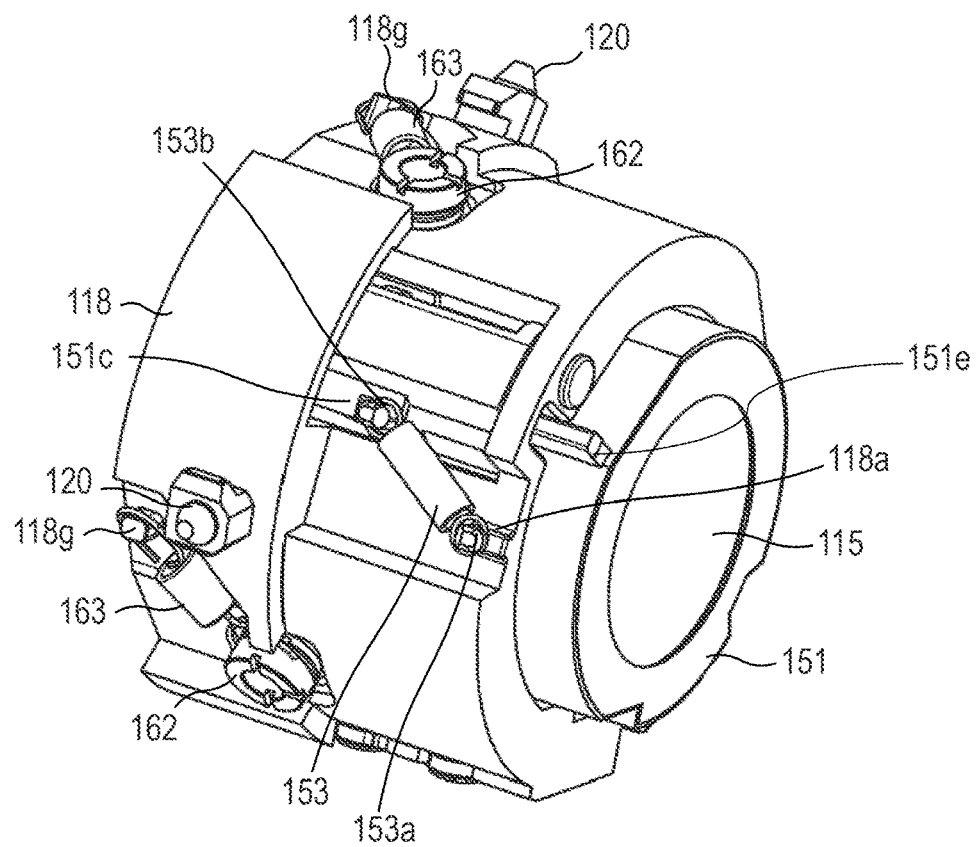
FIG. 11 is a perspective view illustrating the holding structure of a fifth zoom lens unit in the state of the wide angle end and the closest distance focus.
Figure 12:
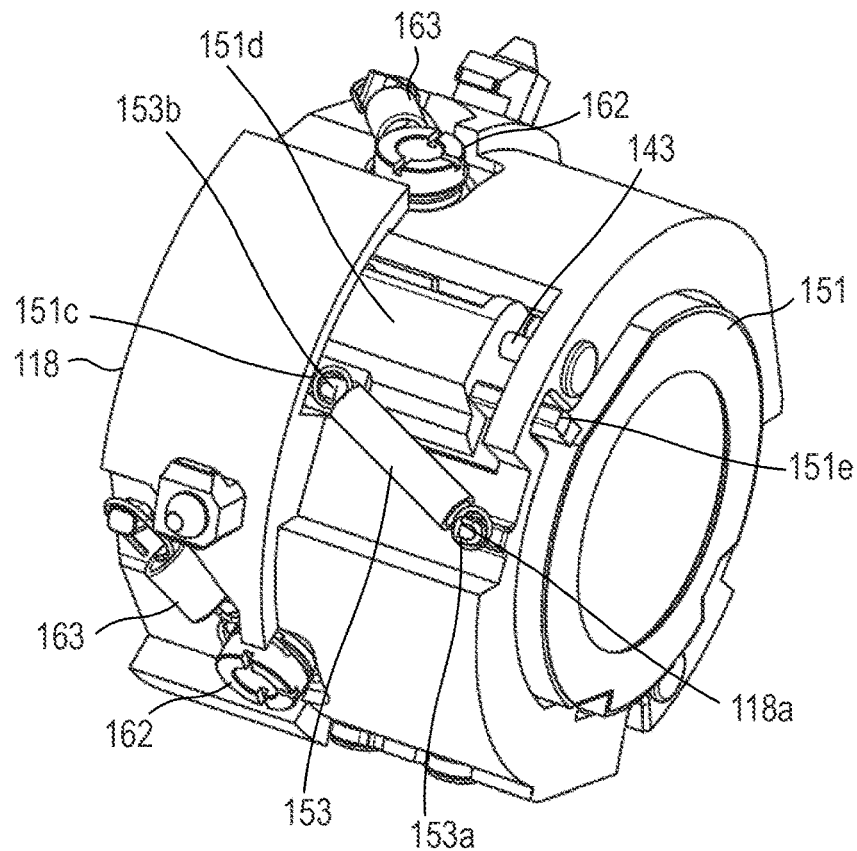
FIG. 12 is a perspective view illustrating the holding structure of the fifth zoom lens unit in the retracted state.
Figure 13:
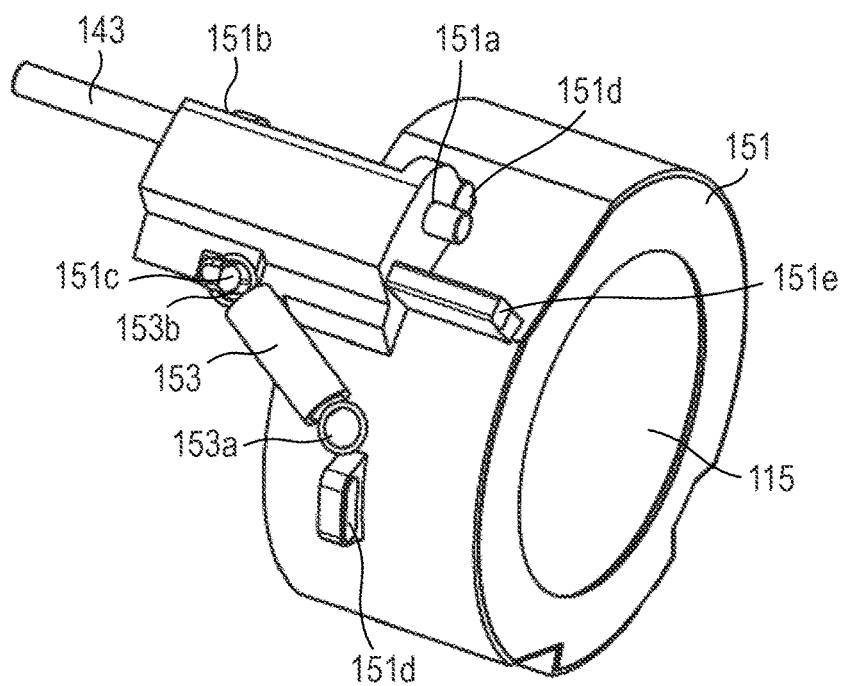
FIG. 13 is a perspective view showing only the fifth zoom lens unit in the state of the wide angle end and the closest distance focus shown in FIG. 11.

FIGS. 11 and 12 are perspective views illustrating the holding structure of the fifth zoom lens unit 115 according to the present invention, while FIG. 11 shows a state of the wide angle end and closest focus and FIG. 12 shows the retracted state. FIG. 13 is a perspective view showing only the fifth zoom lens unit 115 in the same state as shown in FIG. 11.

In FIG. 13, the fifth unit lens holding frame 151 holds a lens that constitutes the fifth zoom lens unit 115. A guide bar (guide shaft member) 143 is a metal member secured to the rear lens unit base barrel 118 and is slidably (movably) engaged to a sliding hole 151a and a sliding hole 151b (two fitting holes separated from each other in the optical axis direction) in the fifth unit lens holding frame 151. With the guide bar 143, the sliding hole 151a and the sliding hole 151b, a guide mechanism is constituted to allow a relative movement between the rear lens unit base barrel 118 and the fifth unit lens holding frame 151 in the optical axis direction. A later-described anti-rotation structure prevents the fifth unit lens holding frame 151 from rotating around the guide bar 143, and the fifth unit lens holding frame 151 is held movably in the optical axis direction relative to the rear lens unit base barrel 118. The guide bar 143 acts as a stopper to stop a rotation of the fourth unit lens holding frame 141 and a movement guide for the fifth unit lens holding frame 151 in the optical axis direction.

The coil spring 153 is a tensile coil spring having a circular hooks 153a and 153b at both ends. The coil spring 153 is engaged with a projection 118a provided on the rear lens unit base barrel 118 by the hook 153a, and the other end hook 153b is engaged with a projection 151c provided on the fifth unit lens holding frame 151. Thus, the fifth unit lens holding frame 151 is always biased toward the image side with respect to the rear lens unit base barrel 118.

Figure 14:
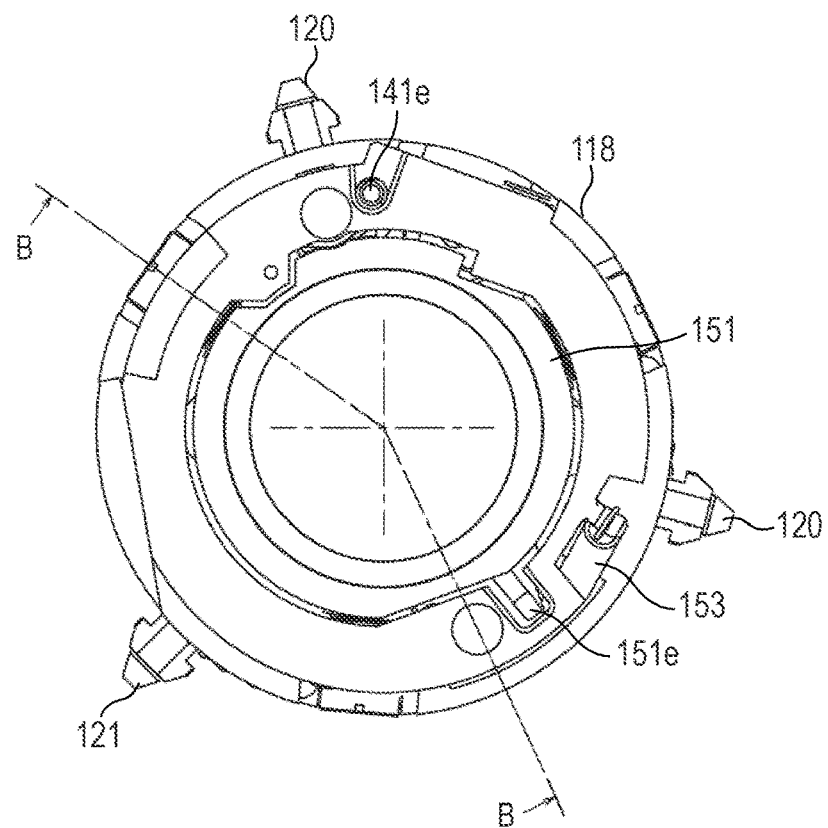
FIG. 14 is a front view of the rear lens unit base barrel in the retracted state as seen from the object side.
Figure 15:
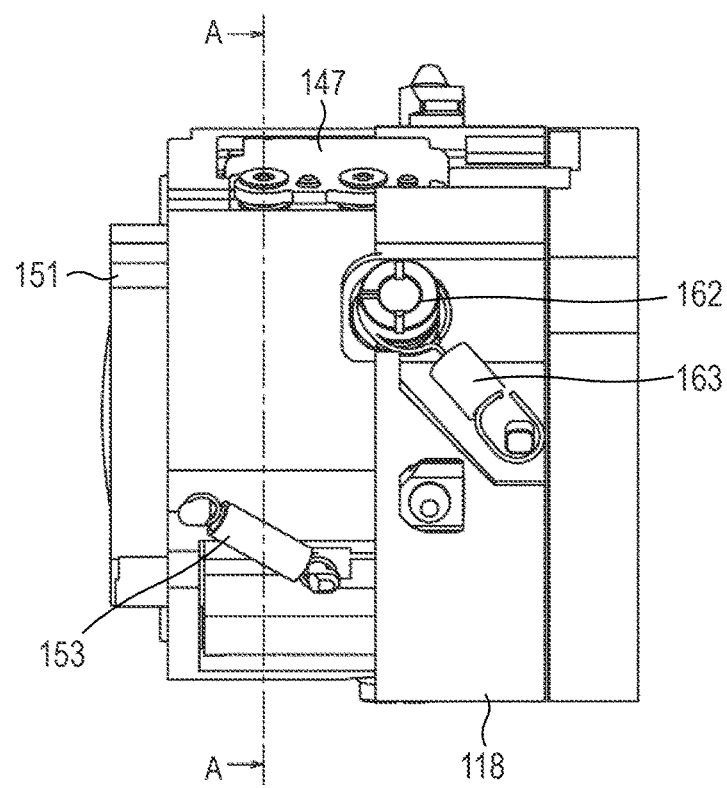
FIG. 15 is a side view of the rear lens unit base barrel in the retracted state shown in FIG. 14.
Figure 17:
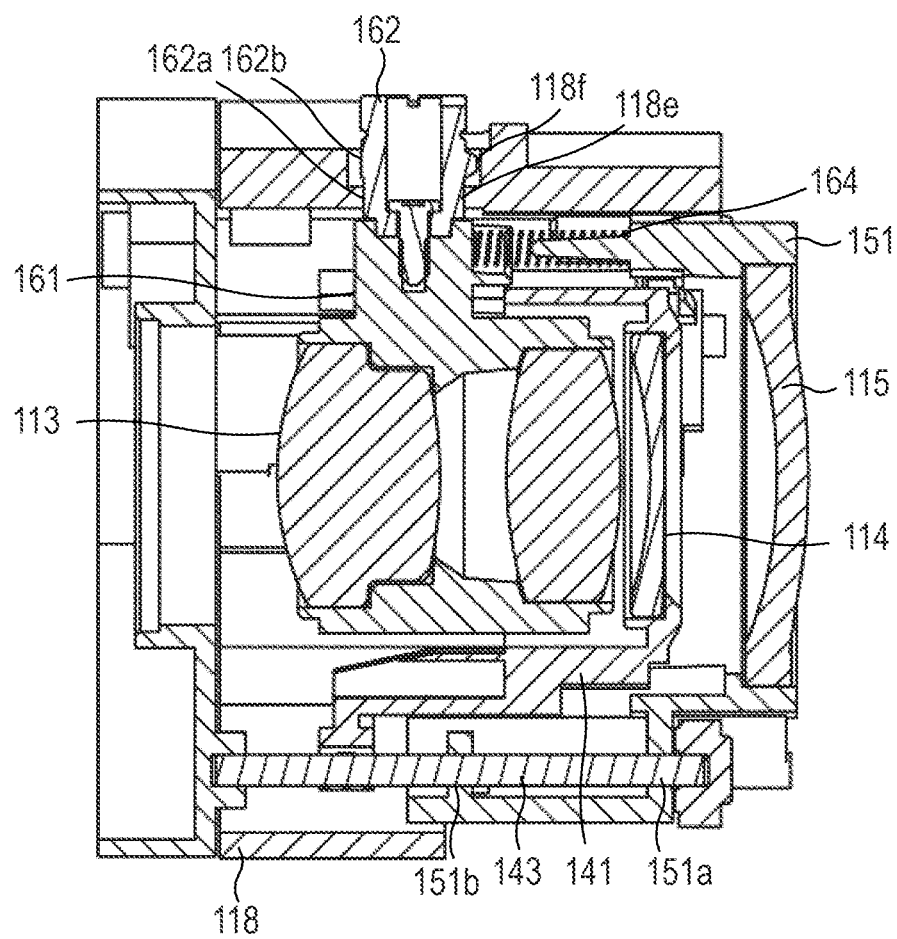
FIG. 17 shows an image pick up state in a sectional view of the rear lens unit base barrel as seen from B-B line in FIG. 14.
Figure 18:
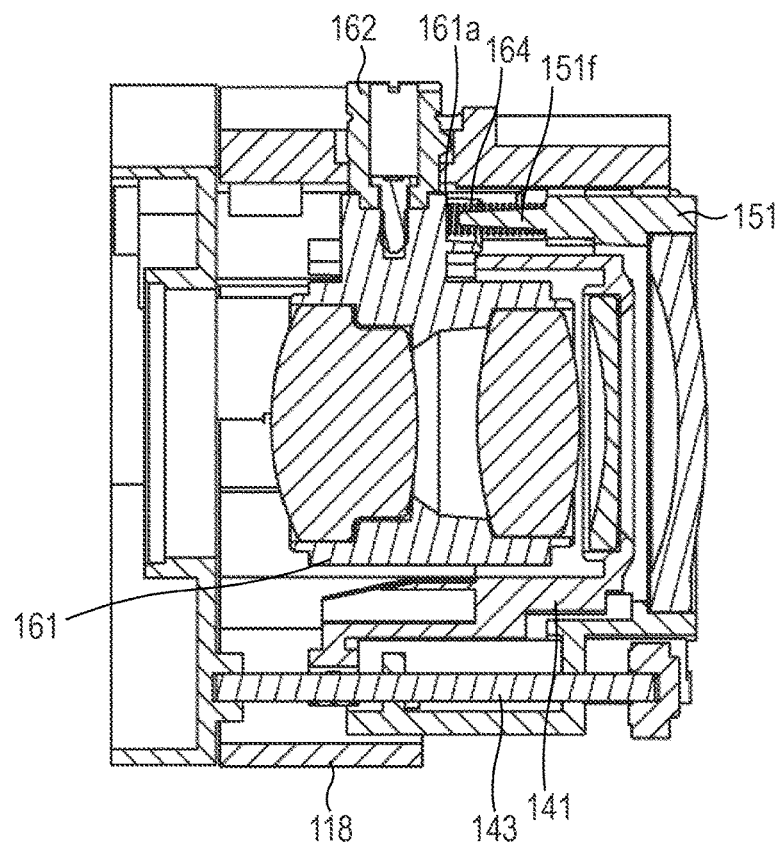
FIG. 18 shows a retracted state in a sectional view of the rear lens unit base barrel as seen from B-B line in FIG. 14.

FIG. 14 is a front view viewed from the image side of the rear lens unit base barrel 118, FIG. 15 is a side view of the rear lens unit base barrel 118 of FIG. 14, and FIG. 16 is a sectional view viewed from the line A-A line in FIG. 15. FIGS. 17 and 18 are sectional views viewed from the line B-B in FIG. 14, FIG. 17 is a state of the wide angle end and focusing at infinity (image pickup state) and FIG. 18 shows the retracted state.

As shown in FIG. 14, the outer circumference of the rear lens unit base barrel 118 has three cam followers provided with equal interval therebetween. Two of the three cam followers are the cam followers 120 that are formed integrally with the rear lens unit base barrel 118. The rest one of the three cam followers is a movable cam follower 121 held in a plane perpendicular to the optical axis by the rear lens unit base barrel 118 and movable in a direction passing through the optical axis (hereafter referred to as a radial direction).

The movable cam follower 121 abuts on the inner circumferential cam groove 108a of the cam cylinder 108 constantly with a predetermined biasing force (elastic force) by means of a compression coil spring (not shown) to prevent the rear lens unit base barrel 118 from tilting due to backlash.

As shown in FIGS. 17 and 18, a third unit lens holding frame 161 constituting the third zoom lens unit 113 is provided with three decentered rollers 162 at three locations and the decentered rollers 162 are held rotatably. The decentered roller 162 has a small diameter portion 162a coaxial to the axis of rotation and an eccentric portion 162b, the small diameter portion 162a engages a circumferential elongated groove 118e provided in the rear lens unit base barrel 118, and the eccentric portion 162b engages a linear guide 118f in the optical axis direction. Thus, by rotating the decentered roller 162, it is possible to adjust an eccentricity of the third unit lens holding frame 161 with respect to the optical axis. A backlash removal spring 163 which is a tensile coil spring is attached to the decentered roller 162. A hook part of the backlash removal spring 163 is attached to the spring hook 118g in the rear lens unit base barrel 118 (See FIGS. 11 and 12).

A biasing sub spring 164, which is a compressed coil spring, is guided by a boss 151f provided on the fifth unit lens holding frame 151, and its tip abuts on a spring receiver 161a of the third unit lens holding frame 161. The biasing sub spring 164 biases the fifth unit lens holding frame 151 toward the image side and the third unit lens holding frame 161 toward the object side at the same time. Therefore, it is not necessary to install the backlash removal spring 163 on the decentered roller 162 that is closest to the biasing sub spring 164.

As shown in FIGS. 11 and 12, the backlash removal spring 163 biases the third unit lens holding frame 161 and the rear lens unit base barrel 118 diagonally to the optical axis, and so that both fitting backlashes generated in the elongated groove 118e and the linear guide 118f are biased in one direction to prevent wobbling. Although the biasing sub spring 164 biases the fifth unit lens holding frame 151 and the third unit lens holding frame 161 toward the optical axis direction in this embodiment, it may be biased diagonally to the optical axis.

Figure 19:
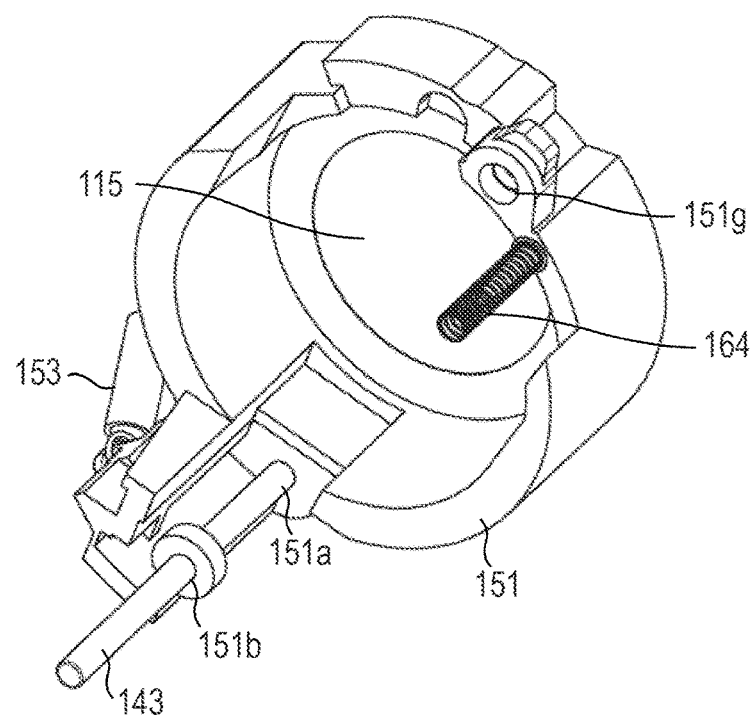
FIG. 19 is a perspective view of the fifth unit lens holding frame as seen from an image side.
Figure 20:
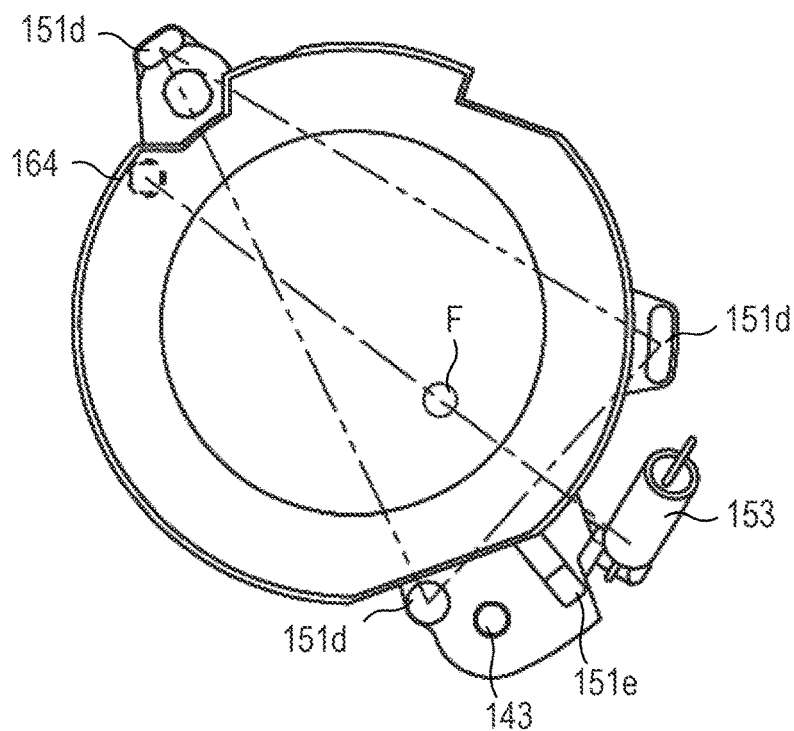
FIG. 20 Illustrates a contact surface in a front view as seen from the image side of fifth unit lens holding frame.

FIG. 19 is a perspective view of the fifth unit lens holding frame 151 as seen from the object side, and FIG. 20 is a front view of the fifth unit lens holding frame 151 as seen from the image side.

The biasing sub spring 164 and the coil spring 153 are arranged facing each other across the optical axis, and the biasing force of the biasing sub spring 164 is set weaker than the biasing force of the coil spring 153. The fifth unit lens holding frame 151 is biased by both the coil spring 153 and the biasing sub spring 164 (a plurality of biasing members, a plurality of elastic members), and a line of action of the resultant force passes through a position indicated by point F in FIG. 20 in a plane perpendicular to the optical axis. This ensures that the point F is located within a triangle connecting the three fifth unit contact surfaces 151d (second contact surfaces) so that when the biasing force of the spring works, the three points of the contact surface contact the contact surface on the rear lens unit base barrel 118 side.

Figure 21:
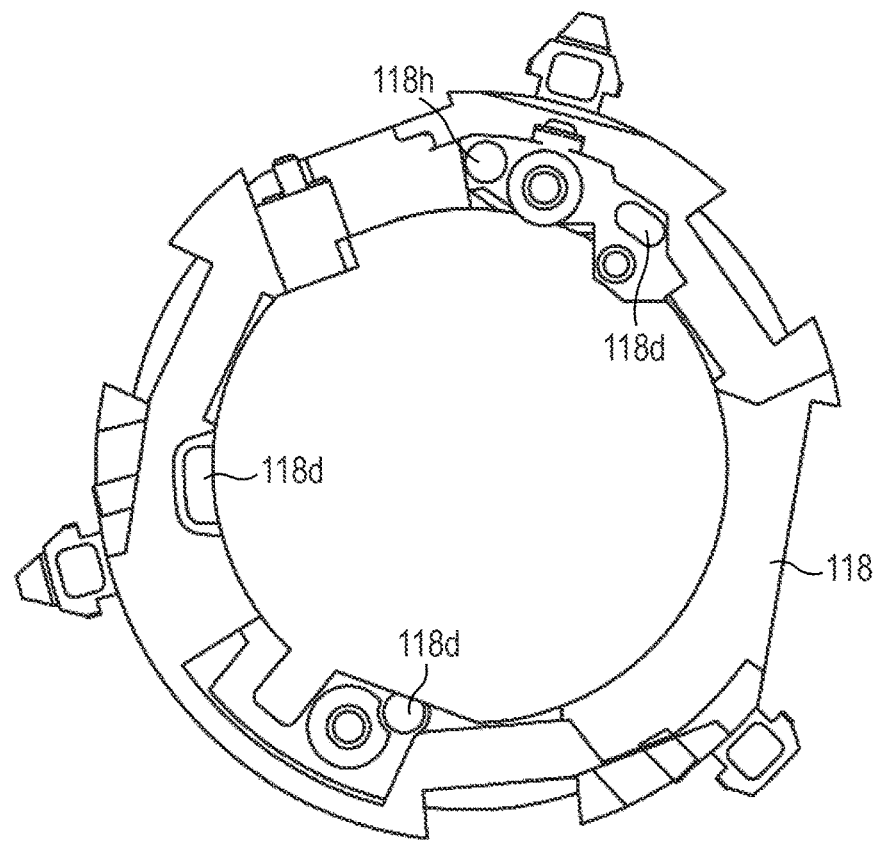
FIG. 21 is a front view of the rear lens unit base barrel as seen from the object side.

FIG. 21 is a front view of the rear lens unit base barrel 118 as seen from the object side as a single component. In the image pickup state, the fifth unit contact surfaces 151d of the fifth unit lens holding frame 151 abut on the rear unit contact surfaces (first contact surface) 118d provided in the flange of the rear lens unit base barrel 118, respectively.

By controlling the accuracy of each contact surface with components, a tilt of the fifth unit lens holding frame 151 with respect to the rear lens unit base barrel 118 can be kept accurate. Specifically, the position tolerances of the cam follower and the rear unit contact surface 118d for the rear lens unit base barrel 118 and the fifth unit contact surface 151d and the lens receiving surface for the fifth unit lens holding frame 151 are set to values that provide the required image quality.

Figure 22:
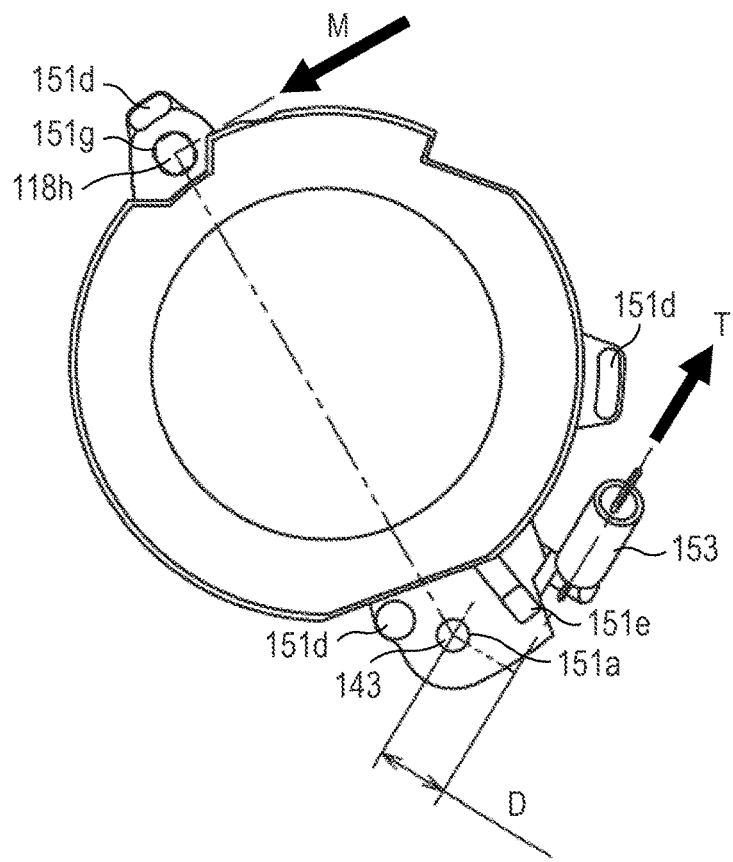
FIG. 22 Illustrates a biasing force in a front view of the fifth unit lens holding frame as seen from the image side.

FIG. 22 is a front view of the fifth unit lens holding frame 151 viewed from the image side, as in FIG. 20. The biasing force of the coil spring 153 works diagonally with respect to the optical axis as indicated by T in the figure. With this, the fifth unit lens holding frame 151 is biased toward the image plane side. At the same time, in a plane perpendicular to the moving direction (optical axis direction) of the fifth unit lens holding frame 151 relative to the guide bar 143 (in the plane of FIG. 22), the fifth unit lens holding frame 151 is biased by the coil spring 153 relative to the guide bar 143 in the T direction shown in FIG. 22. In this way, biasing toward one side is carried out to eliminate wobbling between the outer diameter of the guide bar 143 and the inner diameter of the sliding hole 151a. The guide bar 143 is disposed apart from a straight line including the biasing direction T by a distance indicated by D in the figure. As a result, the fifth unit lens holding frame 151 generates a rotational moment around the guide bar 143, and the elongated hole 151g is constantly biased in a direction M shown in the figure by a rotation stop boss 118h as a rotation stop mechanism installed in the rear lens unit base barrel 118 (see FIG. 21). This keeps them in a biased state to eliminate wobbling in backlash.

The biasing force of the coil spring 153 is set so that the elongated hole 151g is constantly biased from a certain direction against the rotation stop boss 118h in any position under the image pickup state. Thus, the elongated hole 151g may be flat rather than a hole. The rotation stop boss 118h may be used as a plane and the fifth unit lens holding frame 151 may be slid with a projection.

A diameter difference is provided between the sliding hole 151a and the sliding hole 151b provided in the fifth unit lens holding frame 151. A gap between the sliding hole 151a which is close to a lens constituting the fifth zoom lens unit 115 and the guide bar 143 is made small enough to allow movement, thereby preventing the fifth zoom lens unit 115 from causing eccentricity deviation relative to the rear lens unit base barrel 118. Conversely, the gap between the sliding hole 151b and the guide bar 143 is increased to a certain extent to ensure that all of the fifth unit contact surfaces 151d provided in the fifth unit lens holding frame 151 are in contact with the rear unit contact surface 118d of the rear lens unit base barrel 118 in the image pickup state. In other words, it allows the fifth unit lens holding frame 151 to tilt against the guide bar 143. An amount of clearance is set to an appropriate amount so that the contact surfaces are in contact with each other even if the guide bar 143 is tilted to the maximum extent by calculating the machining tolerance of the parts.

As explained above, the positional accuracy of the fifth unit lens holding frame 151 relative to the rear lens unit base barrel 118 can be maintained by biasing the biasing direction of the coil spring 153 in a direction different from the optical axis. In other words, with the movement of the fifth unit lens holding frame 515 in the optical axis direction, biasing toward one side is carried out to eliminate the wobbling that may occur due to the backlash between the guide bar 143 and the rotation stop boss 118h to suppress the eccentricity of the lenses. In addition, by making the fifth unit contact surface 151d and the rear unit contact surface 118d abut on each other, it is possible to prevent the tilt of the lenses and to align the lens with high accuracy.

In the image pickup state, the fifth unit contact surface 151d of the fifth unit lens holding frame 151 abuts on the rear unit contact surface 118d provided on the flange of the rear lens unit base barrel 118, and the rear lens unit base barrel 118 and the fifth unit lens holding frame 151 move integrally.

In the retracted state shown in FIGS. 12 to 18, the rear lens unit base barrel 118 is moved toward the image side, so that the contact portion 151e provided in the fifth unit lens holding frame 151 abuts on the fifth unit abutting portion 102b (see FIG. 10) of the lens mount 102 (a member other than the base lens barrel), which is a fixed part. That would allow the fifth unit lens holding frame 151 to move relative to the rear lens unit base barrel 118 against the biasing force of the coil spring 153 and the biasing sub spring 164.

Therefore, when the cam cylinder 108 is rotated to move the rear lens unit base barrel 118 toward the image side when transferring from the image pickup state to the retracted state (collapsed state), the fourth unit lens holding frame 141 and the fifth unit lens holding frame 151 abut on the lens mount 102 which is a fixed member, or abut on a member that is integral with the lens mount. Since the rear lens unit base barrel 118 moves toward the image side as it is, the fourth unit lens holding frame 141 and the fifth unit lens holding frame 151 move toward the object side with respect to the rear lens unit base barrel 118. In other words, while the rear lens unit base barrel 118 continues to move toward the image side, the fourth unit lens holding frame 141 and the fifth unit lens holding frame 151 abut with a contact portion of the lens mount 102 along the way and become immobile. The rear lens unit base barrel 118 then moves toward the image side and is driven until each interval between adjacent lens units is minimum.

Next, a contact portion between the fourth unit lens holding frame 141 and the fifth unit lens holding frame 151 when the state is changed to the retracted state.

As shown in FIGS. 8 and 9, the guide bar 142 is located beside the contact portion 141e of the fourth unit lens holding frame 141, where the coil spring 145 is located. In the retracted state, a biasing force of the coil spring 145 is transmitted to the rear lens unit base barrel 118 via the rack 146 and the stepping motor 147.

In addition, as shown in FIGS. 11 and 12, the guide bar 143 and the coil spring 153 is provided beside the contact portion 151e of the fifth unit lens holding frame 151, while the biasing force of the coil spring 153 is applied to the rear lens unit base barrel 118 in the retracted state.

By disposing the contact portion and the biasing member for moving the fourth unit lens holding frame 141 and the fifth unit lens holding frame 151 to the retracted state beside guide bar, which is a guide member in the optical axis direction respectively, the force components in a direction perpendicular to the direction of movement applied to the guide bar and the sliding hole can be reduced. This reduces the driving load due to friction and smooths the movement of each of the moving units.

In the description of Embodiment 1 above, the description was made as that the guide bar 143 is fixed to the rear lens unit base barrel 118, and the sliding hole 151a and the sliding hole 151b engaged with the guide bar 143 are fixed to the fifth unit lens holding frame 151, but the invention is not limited to the configuration. The effect of the present invention can be similarly obtained even when the guide bar 143 is fixed to one of the rear lens unit base barrel 118 and the fifth unit lens holding frame 151 and the sliding hole 151a and the sliding hole 151b are configured to the other. As for the second guide mechanism, the effect of the present invention can also be obtained if one of the rear lens unit base barrel 118 and the fourth unit lens holding frame 141 is provided with the guide bar 142 and the other is provided with the sliding hole 141a and the sliding hole 141b.

Embodiment 2

Embodiment 2 of the present invention is described next.

Figure 23:
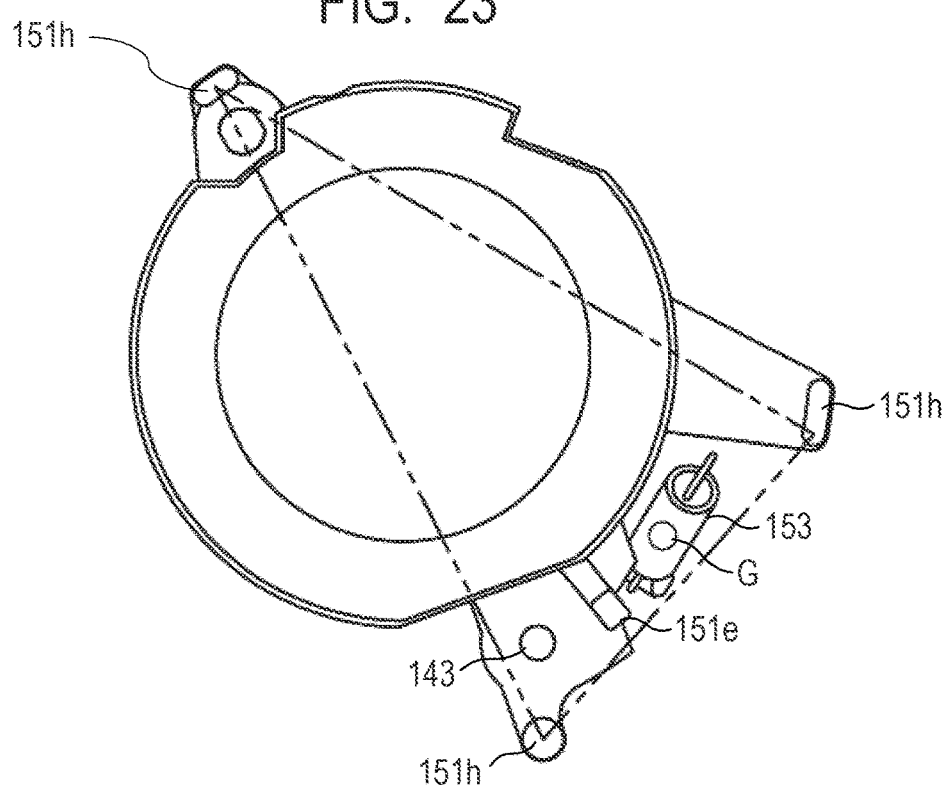
FIG. 23 is a front view of the fifth unit lens holding frame in Embodiment 2 as seen from the image side.

FIG. 23 shows a front view of the fifth unit lens holding frame 151 according to Embodiment 2, as seen from the image plane side. Items having the same function are given the same reference numbers as in Embodiment 1.

There are 3 locations of the fifth unit contact surfaces 151h, which abut on the contact surface on the rear lens unit base barrel 118 side in the image pickup state. The fifth unit contact surface 151h is positioned more radially outer than that of Embodiment 1. And the coil spring 153 serving as a biasing member is located inside a triangle formed by three fifth unit contact surfaces 151h. By doing so, the three contact surfaces can be certainly brought into contact by one coil spring 153 without using a sub biasing member.

Thus, although depending on the space available, placing the contact surface on the outer diameter side will give an advantage in improving the accuracy in tilting of the lens, and it will also be possible to reduce the number of the biasing members.

Although the stepping motor is used to drive the focus lens in this embodiment, the same effect can be achieved by employing a friction-contact type driving means such as an ultrasonic motor. And while the zooming is done manually, the same effect can be obtained even in a case of an electric driving of zooming.

The embodiment is described with respect to interchangeable lenses for picking up still images and moving images, and there is a possibility that the same effect can be obtained in a lens barrel for recording images. It can also be applied to downsize lens barrels by abutting on a fixed member other than the mount or on another moving unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-023372, filed Feb. 18, 2022, which is hereby incorporated by reference herein in its entirety.

What is claimed is:

1. A lens barrel comprising:
a base lens barrel; and
a lens holding frame configured to hold a lens and be movably held in an optical axis direction relative to the base lens barrel,
wherein the base lens barrel has a first contact surface, and the lens holding frame has a second contact surface,
wherein the first contact surface and the second contact surface abut on each other in an image pickup state and separate from each other in the optical axis direction in a retracted state,
wherein the lens barrel comprises a biasing member configured to bias the base lens barrel and the lens holding frame in a different direction from the optical axis, and
wherein a component of the bias of the biasing member in the optical axis direction biases the base lens barrel and the lens holding frame such that the first contact surface and the second contact surface abut on each other.

2. The lens barrel according to claim 1, comprising a guide mechanism configured to enable the base lens barrel and the lens holding frame to move relative to each other in the optical axis direction,
wherein the guide mechanism comprises:
a guide shaft member fixed to one of the base lens barrel and the lens holding frame and having an axial direction in the optical axis direction; and
two fitting holes spaced apart in the optical axis direction, fixed to the other of the base lens barrel and the lens holding frame, and slidably engaged to the guide shaft member in the optical axis direction, and
wherein the base lens barrel and the lens holding frame have a rotation stop mechanism to prevent said the other of the base lens barrel and the lens holding frame from rotating about the guide shaft member.

3. The lens barrel according to claim 1, wherein the base lens barrel has three first contact surfaces, and the lens holding frame has three second contact surfaces, and
wherein each corresponding pair of the three first contact surfaces and the three second contact surfaces abut on each other in the image pickup state and are separated from each other in the optical axis direction in the retracted state.

4. The lens barrel according to claim 1, wherein the lens holding frame has a contact portion configured to abut on a member other than the base lens barrel in the optical axis direction in the retracted state.

5. The lens barrel according to claim 4, wherein the contact portion abuts on a fixed member in the optical axis direction in the retracted state.

6. The lens barrel according to claim 5, wherein the fixed member is a lens mount which is a mounting part to a camera body, or a member integrally configured with the lens mount.

7. The lens barrel according to claim 1, wherein the base lens barrel has a configuration movable in the optical axis direction.

8. The lens barrel according to claim 2, further comprising:
- a second lens holding frame configured to hold a second lens and be held movably relative to the base lens barrel in the optical axis direction; and
- a second guide mechanism to enable the base lens barrel and the second lens holding frame to move relative to each other in the optical axis direction, wherein the second guide mechanism comprises:
- a second guide shaft member fixed to one of the base lens barrel and the second lens holding frame and having an axial direction in the optical axis direction; and
- two second fitting holes spaced apart in the optical axis direction, fixed to the other of the base lens barrel and the lens holding frame, and slidably engaged the second guide shaft member in the optical axis direction, and wherein the base lens barrel and the second lens holding frame have a second rotation stop mechanism that prevents said the other of the base lens barrel and the second lens holding frame from rotating about the second guide shaft member, and wherein the second guide shaft member constitutes the rotation stop mechanism.

9. The lens barrel according to claim 8, wherein the guide shaft member constitutes the second rotation stop mechanism.

10. The lens barrel according to claim 2, wherein of gaps between the two fitting holes and the guide shaft member, the gap of one of the two fitting holes configured near the lens held by the lens holding frame in the optical axis direction is smaller than the other of the two fitting holes.

11. The lens barrel according to claim 1, wherein the biasing member includes a plurality of elastic members and a direction of resultant elastic force of the plurality of elastic members is different from the optical axis direction.

12. The lens barrel according to claim 3, wherein the biasing member includes a plurality of elastic members and a line of action of a resultant elastic force of the plurality of elastic members passes through a triangle formed by the three first contact surfaces.

13. A lens apparatus having a lens barrel, wherein the lens barrel comprising:
- a base lens barrel; and
- a lens holding frame configured to hold a lens and be movably held in an optical axis direction relative to the base lens barrel,
- wherein the base lens barrel has a first contact surface, and the lens holding frame has a second contact surface,
- wherein the first contact surface and the second contact surface abut on each other in an image pickup state and separate from each other in the optical axis direction in a retracted state,
- wherein the lens barrel comprises a biasing member configured to bias the base lens barrel and the lens holding frame in a different direction from the optical axis, and
- wherein a component of the bias of the biasing member in the optical axis direction biases the base lens barrel and the lens holding frame such that the first contact surface and the second contact surface abut on each other.

14. An image pickup apparatus comprising:
- a lens apparatus; and
- an image pickup element for picking up an image formed by a lens barrel, wherein the lens barrel comprises:
- a base lens barrel; and
- a lens holding frame configured to hold a lens and be movably held in an optical axis direction relative to the base lens barrel,
- wherein the base lens barrel has a first contact surface, and the lens holding frame has a second contact surface,
- wherein the first contact surface and the second contact surface abut on each other in an image pickup state and separate from each other in the optical axis direction in a retracted state,
- wherein the lens barrel comprises a biasing member configured to bias the base lens barrel and the lens holding frame in a different direction from the optical axis, and
- wherein a component of the bias of the biasing member in the optical axis direction biases the base lens barrel and the lens holding frame such that the first contact surface and the second contact surface abut on each other.

* * * * *